United States Patent
Zhu et al.

(10) Patent No.: US 9,882,370 B2
(45) Date of Patent: Jan. 30, 2018

(54) SERVICE RESTORATION METHOD FOR MULTI-FAULTS IN DISTRIBUTION NETWORK

(71) Applicants: STATE GRID CORPORATION OF CHINA, Beijing (CN); LAIWU POWER SUPPLY COMPANY OF STATE GRID SHANDONG ELECTRIC POWER COMPANY, Laiwu, Shandong (CN)

(72) Inventors: Guofang Zhu, Jinan (CN); Hongmei Li, Jinan (CN); Jincang Niu, Jinan (CN); Baoguang Zhao, Laiwu (CN); Shangzhen Li, Laiwu (CN); Xin Shi, Jinan (CN); Yong Li, Jinan (CN); Xujie Liu, Laiwu (CN); Guanbin Wu, Jinan (CN); Naiyuan Xu, Jinan (CN); Sun Li, Jinan (CN); Yuanbin Liang, Laiwu (CN)

(73) Assignees: STATE GRID CORPORATION OF CHINA, Beijing (CN); LIAWU POWER SUPPLY COMPANY OF STATE GRID SHANDONG ELECTRIC POWER COMPANY, Laiwu (CN)

( * ) Notice: Subject to any disclaimer, the term of this patent is extended or adjusted under 35 U.S.C. 154(b) by 277 days.

(21) Appl. No.: 14/784,788

(22) PCT Filed: Jun. 19, 2014

(86) PCT No.: PCT/CN2014/080290
§ 371 (c)(1),
(2) Date: Oct. 15, 2015

(87) PCT Pub. No.: WO2015/078172
PCT Pub. Date: Jun. 4, 2015

(65) Prior Publication Data
US 2016/0190789 A1 Jun. 30, 2016

(30) Foreign Application Priority Data

Nov. 28, 2013 (CN) .......................... 2013 1 0625280

(51) Int. Cl.
*H02H 1/00* (2006.01)
*H02H 7/22* (2006.01)
*H02J 3/00* (2006.01)

(52) U.S. Cl.
CPC ............ *H02H 1/0092* (2013.01); *H02H 7/22* (2013.01); *H02J 3/006* (2013.01); *Y04S 10/525* (2013.01)

(58) Field of Classification Search
CPC .......... H02H 1/0092; H02H 7/22; H02J 3/006
See application file for complete search history.

(56) References Cited

U.S. PATENT DOCUMENTS 5,928,368 A 7/1999 Jardine et al.
9,171,250 B2 * 10/2015 Wang ..................... G06N 3/126
(Continued)

FOREIGN PATENT DOCUMENTS

| CN | 102509153 A | 6/2012 |
| CN | 103259261 A | 8/2013 |
| CN | 103593708 A | 2/2014 |

OTHER PUBLICATIONS

Miu et al. "Fast Service Restoration for Large-Scale Distribution systems with priority customers and constraints." IEEE Transactions on Power Systems, vol. 13, No. 3, Aug. 1998, p. 789-795.*
(Continued)

*Primary Examiner* — Scott Bauer
(74) *Attorney, Agent, or Firm* — Oliff PLC

(57) ABSTRACT

A multi-faults service restoration method for a power distribution network overcomes the defect that a traditional service restoration method for the power distribution network cannot solve multi-faults. The method includes the (Continued)

steps of performing multi-faults judgment on multi-faults with processing unfinished, to form many multi-faults and many single-faults; then performing unaided fault recovery area division on the multi-faults, and performing power restoration on unaided fault recovery areas one by one; and after the multi-faults are processed, performing power restoration on each single-fault. By adopting the method, the service restoration efficiency is greatly improved, thus contributing to the real-time of service restoration; the factor of load balance is considered when common power restoration lines are decoupled, so that the load rates of the power restoration lines participating in service restoration are more similar after service restoration, and therefore the power supply reliability of the power distribution network is improved.

6 Claims, 2 Drawing Sheets

(56) References Cited

U.S. PATENT DOCUMENTS 9,250,674 B2 * 2/2016 San Andres .............. G06F 1/30
2009/0112375 A1 * 4/2009 Popescu ................. H02H 7/261
  700/292

OTHER PUBLICATIONS

Hsu et al. "A Heuristic Based Fuzzy Reasoning Approach for Distribution System Service Restoration." IEEE Transactions on Power Delivery, vol. 9, No. 2, Apr. 1994, p. 948-953.*
Sep. 24, 2014 International Search Report issued in International Patent Application No. PCT/CN2014/080290.
Lim et al., "Service Restoration Methodology for Multiple Fault Case in Distribution Systems," IEEE Transactions on Power Systems, vol. 21, No. 4, Nov. 2006, p. 1638-1644.

* cited by examiner

SERVICE RESTORATION METHOD FOR MULTI-FAULTS IN DISTRIBUTION NETWORK

FIELD OF THE INVENTION

The present invention relates to the field of feeder automation, and particularly relates to a service restoration method for multi-faults in distribution network.

BACKGROUND OF THE INVENTION

Service restoration of a power distribution network plays an important role in ensuring the safety and the economical efficiency of a power grid, and is accordingly the problem focused by power systems all the time. The service restoration of the power distribution network is a multi-target nonlinear constraint problem, and is mainly solved by an artificial intelligence algorithm and a heuristic search algorithm; although a relatively optimal restoration path may be finally found by the artificial intelligence algorithm, the calculation quantity is large, and the requirement for real-time is difficult to meet; compared with the artificial intelligence algorithm, the heuristic search algorithm has the advantages of high search speed, good real-time and the like, so in practical application, the heuristic search algorithm is most widely applied. Although there have been many service restoration methods for the power distribution network, these methods are only suitable for solving the problem of single-fault, and multi-faults may appear in practical operation of a power grid under the following conditions: (1) severe weather, e.g. rainstorm, snowstorm and typhoon; (2) destructive human-made disasters, e.g. substation fire caused by forest fire and the like; and (3) overload operation of most lines during power utilization peak in summer.

When the power distribution network has multi-faults, the existing single-fault service restoration strategy can not realize service restoration of non-fault outage areas subjected to multi-faults. After the power distribution network has multi-faults, the service restoration of the fault outage areas subjected to single-fault may influence each other under the following two conditions: under the first condition, the fault recovery areas subjected to single-fault are connected by a loop switch; under such a condition, in view of the physical structure, the power restoration feeder connected with one fault recovery area may provide spare capacity for another fault recovery area; however, when the service restoration of the two fault recovery areas is solved by using a traditional method, the power restoration feeder connected with the one fault recovery area can not provide spare capacity for the another fault recovery area, so that the power restoration feeder can not be sufficiently utilized, and the final service restoration scheme is not optimal. Under the second condition, fault recovery areas subjected to single-fault are connected by two loop switches; under such a condition, a common power restoration feeder exists between the two fault recovery areas; if service restoration of the two fault recovery areas is simultaneously performed by using a traditional single-fault service restoration algorithm, the spare capacity of the common power restoration feeder may be reused, so that the service restoration scheme can not meet the expected requirement and even can not be executed due to overload of the common power restoration feeder.

SUMMARY OF THE INVENTION

The present invention aims to provide a multi-faults service restoration method for a power distribution network for solving the above problems, including the steps of performing multiple fault judgment on multi-faults with processing unfinished, to form several multi-faults and several single-faults; then performing unaided fault recovery area division on the multi-faults, and performing service restoration on unaided fault recovery areas one by one; and after the multi-faults are processed, performing service restoration on each single-fault.

To fulfill the above aim, the present invention adopts the following technical scheme: A multi-faults service restoration method for a power distribution network, including the following several steps:

(1) stopping executing an original fault processing strategy with executing unfinished;

(2) turning on outlet circuit breakers for fault lines;

(3) re-dividing unaided fault recovery areas: if some fault recovery areas subjected to single-fault are connected by a loop switch and these fault recovery areas subjected to single-fault are connected with the remaining fault recovery areas subjected to single-fault by at least one power restoration line, regarding these fault recovery areas subjected to single-fault as a whole, and calling them as unaided fault recovery areas;

(4) determining common power restoration lines and unaided power restoration lines for the unaided fault recovery areas;

(5) re-determining multi-faults;

(6) performing multi-faults power restoration;

(7) forming a power restoration scheme for the fault recovery areas subjected to single-fault by using a single-fault service restoration method; wherein if the power distribution network has only one fault, this fault is a single-fault, the single-fault service restoration algorithm is a traditional fault service restoration algorithm when the power distribution network has only one fault.

In step (3), the specific method for re-dividing unaided fault recovery areas is as follows: after a new fault occurs, the downstream of the new fault line becomes a new fault recovery area; if there are unaided fault recovery areas connected with the new fault recovery area by an loop switch, these unaided fault recovery areas and the new fault recovery areas form new unaided fault recovery areas.

In step (4), the unaided power restoration lines are defined as follows: if a certain power restoration line for multiple fault recovery areas can only supply power to an unaided fault recovery area, the power line is an unaided power restoration line for the unaided fault recovery area; the common power restoration lines are defined as follows: if a certain power restoration line can supply power to several unaided fault recovery area, the power line is a common power restoration line for these unaided fault recovery area.

Step (5) specifically includes the following steps:

(5-1) randomly selecting one unaided fault recovery area, finding all common power restoration lines for the unaided fault recovery area, then finding unaided fault recovery areas connected with the common power restoration lines, setting these unaided fault recovery areas as a first layer of unaided fault recovery areas, and randomly sequencing the unaided fault recovery areas;

(5-2) selecting each unaided fault recovery area on the layer in sequence, and further finding the common power restoration lines connected with the unaided fault recovery areas of the first layer and unaided fault recovery areas connected with the common power restoration lines to form a second layer of unaided fault recovery areas; selecting each unaided fault recovery area on the layer in sequence, and forming the unaided fault recovery areas of the second layer according to the method for foiming the unaided fault recovery areas of the first layer;

(5-3) proceeding while following the same principle, wherein after limited steps, faults involved by the unaided fault recovery areas of all the layers form multi-faults.

Step (6) specifically includes the following steps:

(6-1) calculating spare coefficients: calculating a spare coefficient for each unaided fault recovery area in the absence of a common power restoration line according to a formula $$S\% = \frac{S'}{S} \times 100\%,$$

wherein S is the power loss load of the unaided fault recovery area, and S' is the sum of the spare capacity of the unaided power restoration lines for supplying power to the unaided fault recovery area;

(6-2) performing power restoration on the unaided fault recovery areas one by one according to the spare coefficients from big to small.

Step (6-2) includes the following specific steps:

(a) performing power restoration on the unaided fault recovery areas by using unaided power restoration lines: when power restoration is performed on a certain unaided fault recovery area, if the power supply to all the power loss loads is restored, the common power restoration line does not participate in the power restoration of the fault recovery areas any more; if the power supply to all the power loss loads can not be restored, a common power restoration line with largest spare capacity is added for new power restoration; if the power supply to all the power loss loads still can not be restored, a common power restoration line is further added, till all the power loss loads are restored or no common power restoration line exists;

(b) transforming the common power restoration lines: after the power restoration of a certain unaided fault recovery area is finished, if some common power restoration lines connected with the certain unaided fault recovery area only supply power to an unaided fault recovery area, these common power restoration lines are transformed into corresponding unaided power restoration lines for the unaided fault recovery area; and if the load rate of the part of the common power restoration lines connected with the certain unaided fault recovery area is greater than the spare coefficient of the to-be-restored unaided fault recovery areas connected with these common power restoration lines, the part of the common power restoration lines do not participate in the power restoration of the to-be-restored unaided fault recovery areas any more.

The present invention has the advantages:

1, unaided fault recovery area division is performed on the multiple fault, and power restoration is performed on the unaided fault recovery areas one by one, so that reuse of the common power restoration lines is avoided;

2, the power restoration lines are sufficiently utilized, and the power restoration result is optimized;

3, power restoration can be performed on multiple fault recovery areas simultaneously, so that the power restoration efficiency is greatly improved, thus contributing to the real-time of service restoration.

In which: A-I are power lines; 12, 17, 24 and 34 are section switches; and 7, 19, 25 and 32 are loop switches.

DETAILED DESCRIPTION OF THE EMBODIMENTS

The present invention will be further described below in combination with the accompanying drawings and the embodiments.

Figure 1:
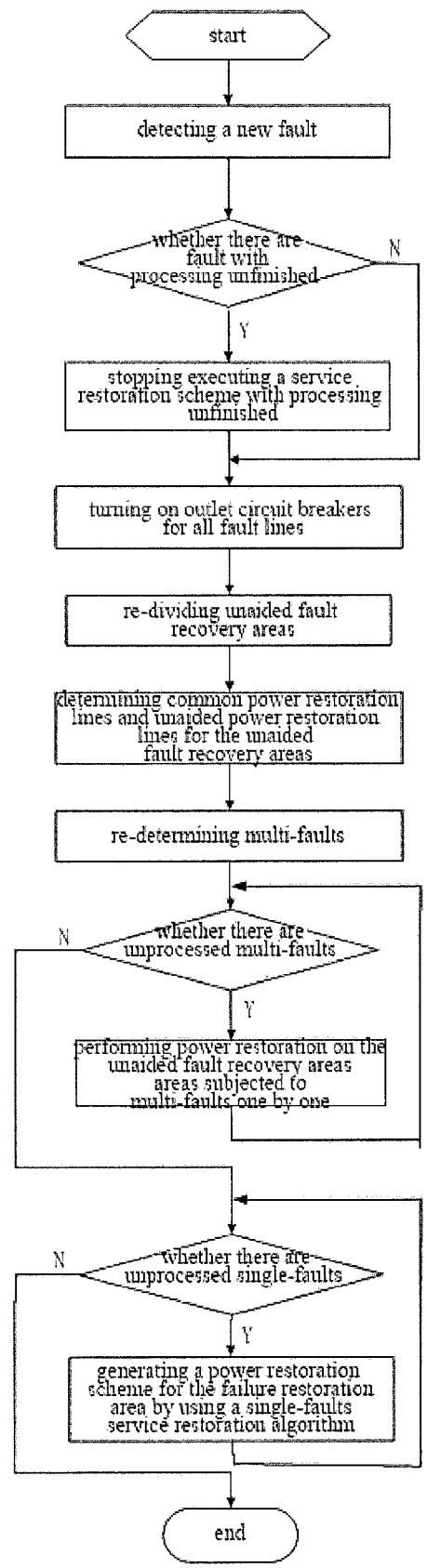
FIG. 1 is a flow schematic diagram of the present invention.

As shown in FIG. 1, a multiple fault service restoration method for a power distribution network specifically includes the following steps:

(1) after the power distribution network has a new fault, stopping executing an original fault processing strategy with executing unfinished;

(2) turning on outlet circuit breakers for all fault lines;

(3) re-dividing unaided fault recovery areas: after the new fault occurs, the downstream of the new fault line becomes a new fault restoration area; if there are unaided fault recovery areas connected with the new fault recovery area by an loop switch, these unaided fault recovery areas and the new fault recovery area form new unaided fault recovery areas;

(4) determining common power restoration lines and unaided power restoration lines for the unaided fault recovery areas: if a certain power restoration line for multiple fault recovery areas can only supply power to an unaided fault recovery area, the power line is an unaided power restoration line for the unaided fault recovery area; if a certain power restoration line can supply power to multiple unaided fault recovery areas, the power line is a common power restoration line for these unaided fault recovery areas; after the new fault occurs, the common power restoration line and the unaided power restoration lines are changed, so the common power restoration lines and the unaided power restoration lines for the unaided fault recovery areas should be re-determined according to the above definition;

(5) re-determining multi-faults: randomly selecting one unaided fault recovery area, adding all common power restoration lines for supplying power to the unaided fault recovery area and unaided fault recovery areas connected with the common power restoration lines, setting the new unaided fault recovery areas added at this stage as a first layer of unaided fault recovery area, and randomly sequencing the unaided fault recovery areas; next, accessing each unaided fault recovery area on the layer in sequence, and further adding the common power restoration lines connected with the unaided fault recovery areas of the first layer and unaided fault recovery areas connected with the common power restoration lines to form a second layer of unaided fault recovery areas; proceeding while following the same principle, and finishing the search after limited steps, wherein faults involved by all the found unaided fault recovery areas form multi-faults;

(6) performing power restoration on the unaided fault recovery areas subjected to multi-faults one by one according to the spare capacity of the unaided power restoration lines for the unaided fault recovery areas and the proportion of the power loss loads of the unaided fault recovery areas: firstly, calculating a spare coefficient for each unaided fault recovery area in the absence of a common power restoration line according to a formula $$S\ \%=\frac{S'}{S}\times 100\%,$$

wherein S expresses the power loss load of the unaided fault recovery area, and S' expresses the sum of the spare capacity of the unaided power restoration lines for supplying power to the unaided fault recovery area; secondly, performing power restoration on the unaided fault recovery areas one by one according to the spare coefficients from big to small: when power restoration is performed on a certain unaided fault recovery area, an unaided power restoration line is firstly utilized to perform power restoration on the unaided fault recovery area; if the power supply to all the power loss loads can be restored, the common power restoration line does not participate in the power restoration of the power restoration area any more; if the power supply to all the power loss loads can not be restored, a common power restoration line with largest spare capacity is added for new power restoration; if the power supply to all the power loss loads still can not be restored, a common power restoration line is further added, till all the power loss loads are restored or no common power restoration line exists; after the power restoration of the certain unaided fault recovery area is finished, if some common power restoration lines connected with the certain independent failure restoration area only supply power to an unaided fault recovery area, these common power restoration lines are transformed into corresponding unaided power restoration lines for the unaided fault recovery area; and if the load rate of some common power restoration lines connected with the certain unaided fault recovery area reaches a very high level, such common power restoration lines are directly removed and do not participate in subsequent power restoration any more;

(7) forming a service restoration scheme for the fault recovery areas subjected to single-fault by using a single-fault service restoration method.

Figure 2:
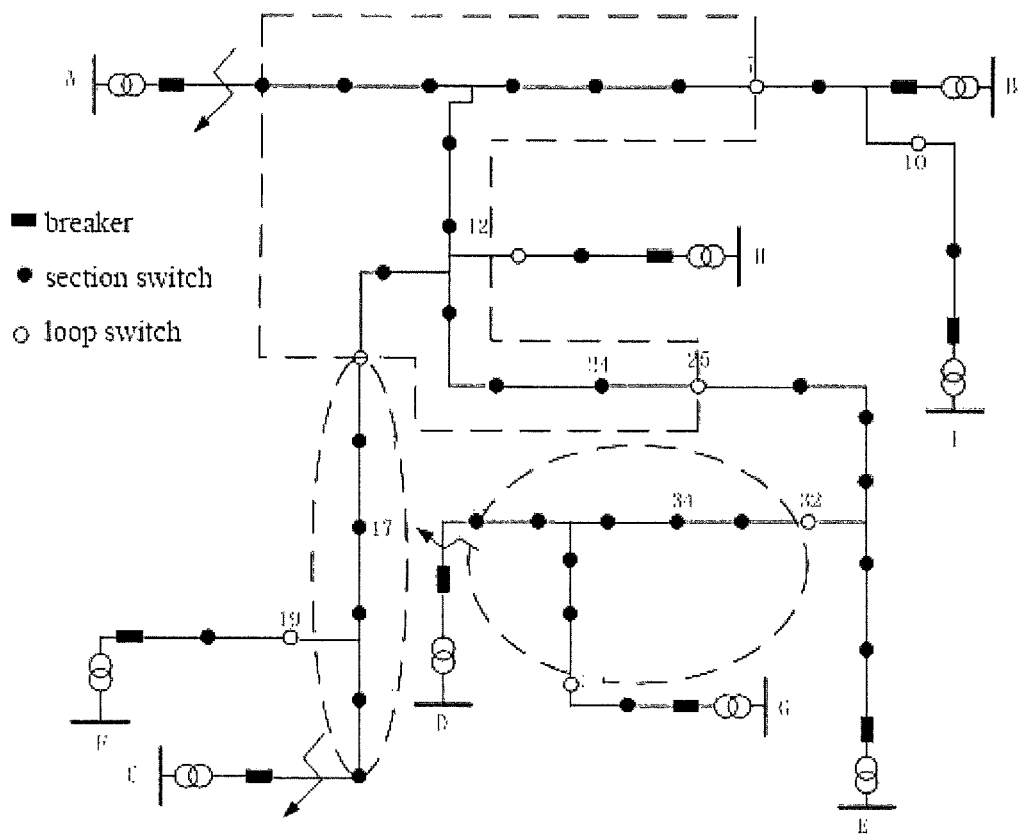
FIG. 2 is a structural schematic diagram of a power distribution network of the present invention.

As shown in FIG. 2, it is supposed that before the power line D fails within short time, the power lines A and C have failed, and execution of a failure restoration strategy is not yet finished; the fault recovery area of the power line D is restored by using an original single-fault service restoration strategy; because the power line E needs to perform power restoration on the fault recovery area of the power line A, two fault recovery areas subjected to single-fault are connected by two loop switches; under such a condition, a common power restoration line is provided between the two fault recovery areas; if power restoration is simultaneously performed on the two fault recovery areas by using a traditional single-fault service restoration algorithm, the spare capacity of the common power restoration line is reused, so that the service restoration scheme can not meet the expected requirement, e.g. there are two fault recovery areas A and C in the figure, a common power line E is provided between the two fault recovery areas, and when the power restoration is performed by using the single-fault service restoration strategy, in the service restoration scheme of the fault recovery area A, the calculated load of the common power line E is the sum of the actual load of the common power line E before power restoration and the power loss load of the restored fault recovery area A restored by the common power line E; in the service restoration scheme of the fault recovery area C, the calculated load of the common power line E is the sum of the actual load of the common power line E before power restoration and the power loss load of the fault recovery area C restored by the common power line E; the actual load of the common power line E is the sum of the actual load of the common power line E before power restoration, the power loss load of the restored fault recovery area A and the power loss load of the restored fault recovery area C; and the spare capacity of the common power line E is reused, so that the final service restoration scheme can not meet the requirement, and even the service restoration scheme can not be executed due to overload of the common power line E.

However, such problems can be solved by using the method proposed by the present application.

Firstly, the original fault processing strategy with executing unfinished is stopped, and the outlet circuit breakers for the fault lines are turned on. It could be known according to the method of step 3 that, the fault recovery areas of the power lines A and C form an unaided fault recovery area 1, and the fault recovery area of the power line E forms an unaided fault recovery area 2. It could be known according to the method of step 4 that, the power lines B, F and H are unaided power restoration lines for the unaided fault recovery area 1, and the power line G is an unaided power restoration line for the unaided fault recovery area 2. The power line E is a common power restoration line for the two unaided fault recovery areas. It could be known according to the method of step 5 that, three faults form a multi-faults, and the fault recovery area subjected to the multi-faults consists of two unaided fault recovery areas. Power restoration is performed on the multi-faults according to the method of step 6, and the final service restoration scheme is as follows: turning on the loop switch 15, turning off section switches 12, 17, 24 and 34, and turning on loop switches 7, 19, 25 and 32.

It could be seen from the final service restoration scheme that, the power restoration line H originally supplying power to the fault recovery area of the power line A provides spare capacity for the fault recovery area of the power line C, so the result is optimized. Reuse of the common power restoration lines is avoided by performing power restoration on the unaided fault recovery areas subjected to multi-failures one by one. If multiple failures are divided into several multi-faults, the power restoration may be simultaneously performed on the multi-faults recovery areas, thus contributing to the real-time of the service restoration.

Although the specific implementations of the present invention are described above in combination with the accompanying drawings, but the protection scope of the present invention is not limited thereto. It should be understood by those skilled in the art that various alterations or modifications may be made on the basis of the technical schemes of the present invention without any creative effort, and these alterations or modifications are still within the protection scope of the present invention.

The invention claimed is:

1. A multi-faults service restoration method for a power distribution network, comprising the following several steps:

(1) stopping executing an original fault processing strategy with executing unfinished;

(2) turning on outlet circuit breakers for fault lines;

(3) re-dividing unaided fault recovery areas: if some fault recovery areas subjected to single-fault are connected by a loop switch and these fault recovery areas subjected to single-fault are connected with the remaining fault recovery areas subjected to single-fault by at least one power restoration line, regarding these fault recovery areas subjected to single-fault as a whole, and calling them as unaided fault recovery areas;

(4) determining common power restoration lines and unaided power restoration lines for the unaided fault recovery areas;
(5) re-determining multi-faults;
(6) performing multi-faults service restoration;
(7) forming a service restoration scheme for the fault recovery areas subjected to single-fault by using a single-fault service restoration method; wherein if the power distribution network has only one fault, this fault is a single-fault, the single-fault service restoration algorithm is a traditional service restoration algorithm when the power distribution network has only one fault.

2. The multi-faults service restoration method for the power distribution network of claim 1, wherein in step (3), the specific method for re-dividing unaided fault recovery areas is as follows: after a new fault occurs, the downstream of the new fault line becomes a new fault recovery area; if there are unaided fault recovery areas connected with the new fault recovery area by a loop switch, these unaided fault recovery areas and the new fault recovery area form new unaided fault recovery areas.

3. The multi-faults service restoration method for the power distribution network of claim 1, wherein in step (4), the unaided power restoration lines are defined as follows: if a certain power restoration line for multi-faults recovery areas can only supply power to an unaided fault recovery area, the power line is an unaided power restoration line for the unaided fault recovery area; the common power restoration lines are defined as follows: if a certain power restoration line can supply power to several unaided fault recovery areas, the power line is a common power restoration line for these unaided fault recovery areas.

4. The multi-faults service restoration method for the power distribution network of claim 1, wherein step (5) specifically comprises the following steps:
(5-1) randomly selecting one unaided fault recovery area, finding all common power restoration lines for the unaided fault recovery area, then finding unaided fault recovery areas connected with the common power restoration lines, setting these unaided fault recovery areas as a first layer of unaided fault recovery areas, and randomly sequencing the unaided fault recovery areas;
(5-2) selecting each unaided fault recovery area on the layer in sequence, and further finding the common power restoration lines connected with the unaided fault recovery areas of the first layer and unaided fault recovery areas connected with the common power restoration lines to form a second layer of unaided fault recovery areas; selecting each unaided fault recovery area on the layer in sequence, and forming the unaided fault recovery areas of the second layer according to the method for forming the unaided fault recovery areas of the first layer;
(5-3) proceeding while following the same principle, wherein after limited steps, failures involved by the unaided fault recovery areas of all the layers form multi-faults.

5. The multi-failure power restoration method for the power distribution network of claim 1, wherein step (6) specifically comprises the following steps:
(6-1) calculating spare coefficients: calculating a spare coefficient for each unaided fault recovery area in the absence of a common power restoration line according to a formula $$S\% = \frac{S'}{S} \times 100\%,$$

wherein S is the power loss load of the unaided fault recovery area, and S' is the sum of the spare capacity of the unaided power restoration lines for supplying power to the unaided fault recovery area;
(6-2) performing power restoration on the unaided fault recovery areas one by one according to the spare coefficients from big to small.

6. The multi-failure power restoration method for the power distribution network of claim 5, wherein step (6-2) comprises the following specific steps:
(a) performing power restoration on the unaided fault recovery areas by using unaided power restoration lines: when power restoration is performed on a certain unaided fault recovery area, if the power supply to all the power loss loads is restored, the common power restoration line does not participate in the power restoration of the fault recovery areas any more; if the power supply to all the power loss loads can not be restored, a common power restoration line with largest spare capacity is added for new power restoration; if the power supply to all the power loss loads still can not be restored, a common power restoration line is further added, till all the power loss loads are restored or no common power restoration line exists;
(b) transforming the common power restoration lines: after the power restoration of a certain unaided fault recovery area is finished, if some common power restoration lines connected with the certain unaided fault recovery area only supply power to an unaided fault recovery area, these common power restoration lines are transformed into corresponding unaided power restoration lines for the unaided fault recovery area; and if the load rate of the part of the common power restoration lines connected with the certain unaided fault recovery area is greater than the spare coefficient of the to-be-restored unaided fault recovery areas connected with these common power restoration lines, the part of the common power restoration lines do not participate in the power restoration of the to-be-restored unaided fault recovery areas any more.

* * * * *